(12) United States Patent
Geissler et al.

(10) Patent No.: US 10,422,679 B2
(45) Date of Patent: Sep. 24, 2019

(54) METERING NOZZLE FOR SQUEEZE BOTTLE

(71) Applicant: WiSys Technology Foundation, Inc., Madison, WI (US)

(72) Inventors: Jonathan P. Geissler, De Pere, WI (US); Dawson J. Nemmers, Peosta, IA (US)

(73) Assignee: WiSys Technology Foundation, Inc., Madison, WI (US)

( * ) Notice: Subject to any disclaimer, the term of this patent is extended or adjusted under 35 U.S.C. 154(b) by 0 days.

(21) Appl. No.: 15/935,308

(22) Filed: Mar. 26, 2018

(65) Prior Publication Data

US 2018/0274963 A1  Sep. 27, 2018

Related U.S. Application Data

(60) Provisional application No. 62/477,084, filed on Mar. 27, 2017.

(51) Int. Cl.
*G01F 11/32* (2006.01)
*G01F 11/28* (2006.01)
*G01F 15/00* (2006.01)

(52) U.S. Cl.
CPC ............ *G01F 11/32* (2013.01); *G01F 11/288* (2013.01); *G01F 15/005* (2013.01)

(58) Field of Classification Search
CPC ....... G01F 11/02–088; G01F 11/30–32; G01F 11/10–268; B65D 47/061; B65D 47/24–247; B65D 47/2075
USPC ........ 222/212–213, 305, 307–308, 450, 451, 222/453, 491, 496–497, 532, 545, 222/541.1–541.6, 559
See application file for complete search history.

(56) References Cited

U.S. PATENT DOCUMENTS

| | | | | |
|---|---|---|---|---|
| 1,896,729 A | * | 2/1933 | Jakubec | B65D 47/2075 137/541 |
| 1,912,022 A | * | 5/1933 | Thompson | B65D 47/2075 137/540 |
| 1,948,070 A | * | 2/1934 | Hasse | B65D 47/2087 222/493 |
| 1,971,371 A | * | 8/1934 | Donnelly | B65D 47/2087 222/493 |
| 1,982,294 A | * | 11/1934 | Griffin | B65D 47/2075 137/541 |
| 2,080,427 A | * | 5/1937 | McLaughlin | B65D 47/2075 222/496 |
| 2,603,397 A | * | 7/1952 | Olson | G01F 11/32 141/292 |
| 2,659,518 A | * | 11/1953 | Donnelly | G01F 11/32 222/449 |

(Continued)

*Primary Examiner* — Frederick C Nicolas
*Assistant Examiner* — Randall A Gruby
(74) *Attorney, Agent, or Firm* — Boyle Fredrickson S.C.

(57) ABSTRACT

The present invention provides a metering nozzle used with a squeezable bottle for dispensing a fixed amount of fluid from the bottle. A dispensing chamber volume of the metering nozzle may be adjusted to adjust the volume of fluid dispensed from the bottle. The nozzle allows the fixed amount of fluid to be measured and then dispensed without returning into the bottle by utilizing a movable piston, shuttling between the nozzle inlet and the nozzle outlet by applying a compression force to the bottle against a biasing force of a spring.

10 Claims, 2 Drawing Sheets

(56) References Cited

U.S. PATENT DOCUMENTS

| | | | | |
|---|---|---|---|---|
| 2,759,641 A * | 8/1956 | Hersh | | G01F 11/32 |
| | | | | 222/442 |
| 2,808,169 A * | 10/1957 | Gruber | | B65D 47/242 |
| | | | | 222/521 |
| 3,128,915 A * | 4/1964 | Matter | | G01F 11/16 |
| | | | | 222/156 |
| 3,141,579 A * | 7/1964 | Medlock | | A47G 19/32 |
| | | | | 222/207 |
| 3,141,580 A * | 7/1964 | Rogers | | B65D 47/2062 |
| | | | | 222/213 |
| 3,190,508 A * | 6/1965 | Petersen | | B65D 83/54 |
| | | | | 222/402.2 |
| 3,319,837 A * | 5/1967 | Mueller | | B65D 83/00 |
| | | | | 222/212 |
| 3,438,554 A * | 4/1969 | Schwartzman | | B65D 47/2075 |
| | | | | 222/496 |
| 3,506,162 A * | 4/1970 | Schwartzman | | B05B 11/047 |
| | | | | 222/207 |
| 3,658,216 A * | 4/1972 | Schwartzman | | G01F 11/32 |
| | | | | 222/453 |
| 3,666,150 A * | 5/1972 | Liljeholm | | G01F 11/34 |
| | | | | 222/453 |
| 3,705,668 A * | 12/1972 | Schwartzman | | B65D 47/2075 |
| | | | | 222/207 |
| 3,743,146 A * | 7/1973 | Schindler | | A47K 5/1211 |
| | | | | 222/446 |
| 3,828,985 A * | 8/1974 | Schindler | | A47K 5/1211 |
| | | | | 222/207 |
| 3,849,863 A * | 11/1974 | Schwartzman | | B23P 19/00 |
| | | | | 264/242 |
| 4,210,263 A * | 7/1980 | Bos | | G01F 11/32 |
| | | | | 222/449 |
| 4,323,179 A * | 4/1982 | Crespi | | G01F 11/263 |
| | | | | 222/449 |
| 4,376,495 A | 3/1983 | Spatz | | |
| 4,690,304 A * | 9/1987 | Morel | | B65D 47/24 |
| | | | | 222/153.14 |
| 5,000,353 A * | 3/1991 | Kostanecki | | G01F 11/263 |
| | | | | 222/207 |
| 5,074,440 A | 12/1991 | Clements et al. | | |
| 5,127,553 A | 7/1992 | Weinstein | | |
| 5,899,624 A * | 5/1999 | Thompson | | B43K 5/1845 |
| | | | | 401/196 |
| 6,244,476 B1 * | 6/2001 | Moretti | | B65D 47/242 |
| | | | | 222/520 |
| 6,330,960 B1 | 12/2001 | Faughey et al. | | |
| 6,974,053 B2 * | 12/2005 | Lautre | | B65D 47/2081 |
| | | | | 222/92 |
| 7,249,694 B2 * | 7/2007 | Masuda | | B65D 35/14 |
| | | | | 222/212 |
| 8,528,791 B2 * | 9/2013 | Fernandez de Mendiola Quintana | | B65D 47/0838 |
| | | | | 222/213 |
| 8,851,333 B2 * | 10/2014 | van de Poll | | B05B 11/04 |
| | | | | 222/207 |
| 9,694,374 B2 * | 7/2017 | Bell | | B05B 11/0064 |
| 2011/0089191 A1 * | 4/2011 | Altonen | | G01F 11/286 |
| | | | | 222/1 |
| 2014/0231462 A1 * | 8/2014 | Ray | | A47K 5/1202 |
| | | | | 222/207 |

* cited by examiner

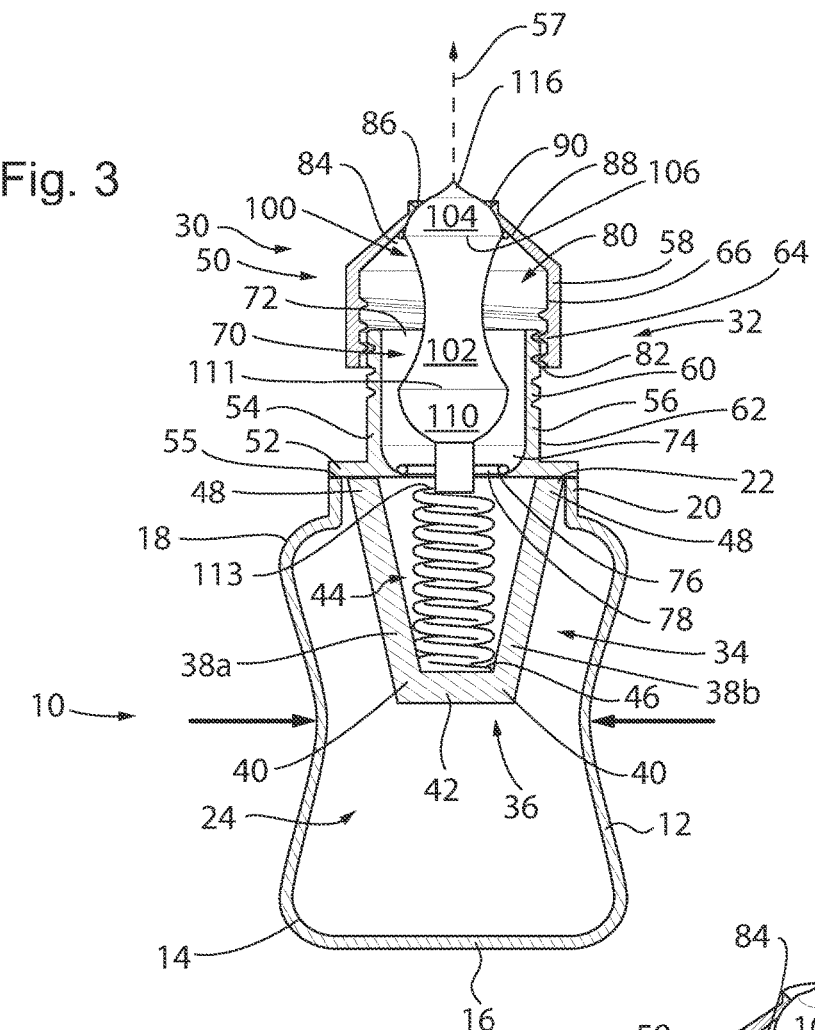
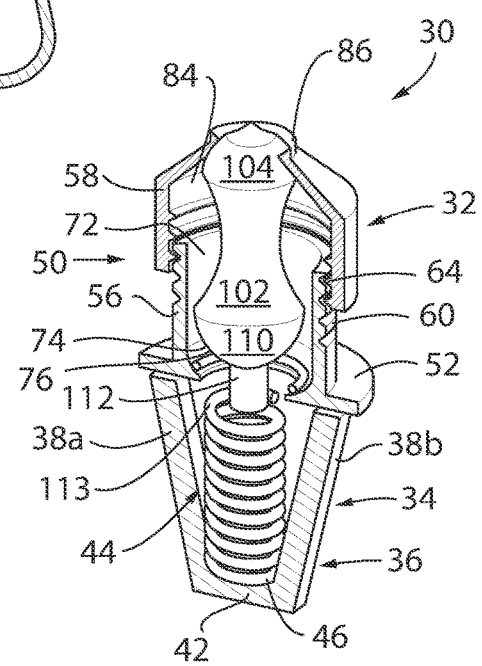

METERING NOZZLE FOR SQUEEZE BOTTLE

CROSS REFERENCE TO RELATED APPLICATION

This application claims the benefit of U.S. provisional application 62/477,084 filed Mar. 27, 2017 and is hereby incorporated by reference.

STATEMENT REGARDING FEDERALLY SPONSORED RESEARCH OR DEVELOPMENT

N/A

BACKGROUND OF THE INVENTION

The present invention relates to a nozzle for a squeeze bottle and in particular to a metering nozzle which dispenses a fixed amount of fluid material from a squeeze bottle.

Metering dispensers provide a means for the user to determine the amount of fluid material that is dispensed from the container. These types of dispensers typically rely upon a two-step system in which fluid from a primary chamber is forced into a secondary chamber by, for example, squeezing the container. Once the desired amount of fluid is squeezed into the secondary chamber, the user depresses or squeezes the container to dispense the fluid from the secondary chamber.

The movement of the fluid from the primary chamber to the secondary chamber is typically limited by a one-way valve preventing backflow of the fluid from the secondary chamber back into the primary chamber. A known one-way valve used in these constructions are ball valves which include a ball seated at the exit of a dip tube and pushed up during squeezing of the bottle to allow fluid to exit the dip tube into the secondary chamber. The bottle is then inverted and squeezed a second time to allow the fluid to exit the secondary chamber in a metered fashion.

SUMMARY OF THE INVENTION

The present invention provides a metering nozzle used with a squeezable bottle for dispensing a fixed amount of fluid from the bottle. A dispensing chamber volume of the metering nozzle may be adjusted to regulate the volume of fluid dispensed from the bottle. The nozzle allows the fixed amount of fluid to be measured and then dispensed without returning into the bottle by utilizing a movable piston, shuttling between the nozzle inlet and the nozzle outlet by applying a compression force to the bottle against a biasing force of a spring.

In one embodiment of the present invention, a dispensing bottle for liquids including a bottle having an open top and compressible by a user to expel a fluid from the bottle out of the open top; a fluid chamber defining an internal volume and having an upper opening and a lower opening, the latter communicating with the open top of the bottle; and a piston held within the internal volume and moveable within the internal volume of the enclosed chamber between a retracted position and an extended position whereby, in the retracted position, the piston is seated against the lower opening to prevent flow through the lower opening and allow flow through the upper opening and, in the extended position, the piston is seated against the upper opening to prevent flow through the upper opening and allow flow through the lower opening; wherein the piston is biased toward the first position by a spring.

It is thus a feature of at least one embodiment of the present invention to provide metered dispensing from a squeeze bottle without utilizing a dip tube.

The piston may provide a drag surface interacting with a liquid entering the internal volume to hold the piston along with the entering liquid against the biasing force of the spring.

It is thus a feature of at least one embodiment of the present invention to use the force of the squeezed liquid against the force of the spring against the piston to open and close the nozzle.

The piston may provide opposed ends joined by a narrower waist such that a first end may abut the upper opening and a second end may abut the lower opening in the extended and retracted positions respectively. The first end and second end may be seated against correspondingly shaped inner surfaces of the enclosed fluid chamber. A length of the piston may be less than a distance between the upper opening and lower opening of the enclosed fluid chamber.

It is thus a feature of at least one embodiment of the present invention to carry the shuttling piston within the internal volume for opening and closing the nozzle without occupying excessive volume for carrying the fluid.

The fluid chamber may be adjustable to change the internal volume. The fluid chamber may have two halves moveable with respect to each other whereby movement of the two halves changes the internal volume. The fluid chamber may be two halves joined by screw threads to change the internal volume.

It is thus a feature of at least one embodiment of the present invention to allow the user to adjust the metered volume of liquid dispensed prior to dispensing.

The spring may prevent opening of the lower opening under the force of gravity alone. The spring may be an extension spring. The spring may be connected to the piston on a first end and a fixed support bar on a second end. The fixed support bar may be spaced from the piston and positioned within the bottle.

It is thus a feature of at least one embodiment of the present invention to use the force of the spring against the force of the liquid when squeezing to bias the piston toward the closed position.

The bottle may further include an elastomeric seal on the lower opening.

It is thus a feature of at least one embodiment of the present invention to prevent backwash of the dispensed fluid from the fluid chamber back into the bottle.

In another embodiment of the present invention, a method of dispensing a fluid from a bottle includes providing a bottle having an open top and compressible by a user to expel a fluid from the bottle out of the open top, a fluid chamber defining an internal volume and having an upper opening and a lower opening, the latter communicating with the open top of the bottle, the fluid chamber adjustable to change the internal volume, and a piston held within the internal volume and moveable within the internal volume of the enclosed chamber between a retracted position and an extended position whereby, in the retracted position, the piston is seated against the lower opening to prevent flow through the lower opening and allow flow through the upper opening and, in the extended position, the piston is seated against the upper opening to prevent flow through the upper opening and allow flow through the lower opening, wherein the piston is biased toward the first position by a spring; compressing the bottle to decrease a volume within the bottle thereby forcing the piston to the second position and forcing fluid to flow into the enclosed chamber; releasing compression force on the bottle; and dispensing the fluid from the upper opening of the enclosed chamber.

These particular objects and advantages may apply to only some embodiments falling within the claims and thus do not define the scope of the invention.

BRIEF DESCRIPTION OF THE DRAWINGS

FIG. 3 is a side cross-sectional elevation view of the squeeze bottle of FIG. 1 showing the metering nozzle in a second upward position; and FIG. 4 is a perspective cross-sectional view of the squeeze bottle of FIG. 3.

DETAILED DESCRIPTION OF THE PREFERRED EMBODIMENT

Figure 1:
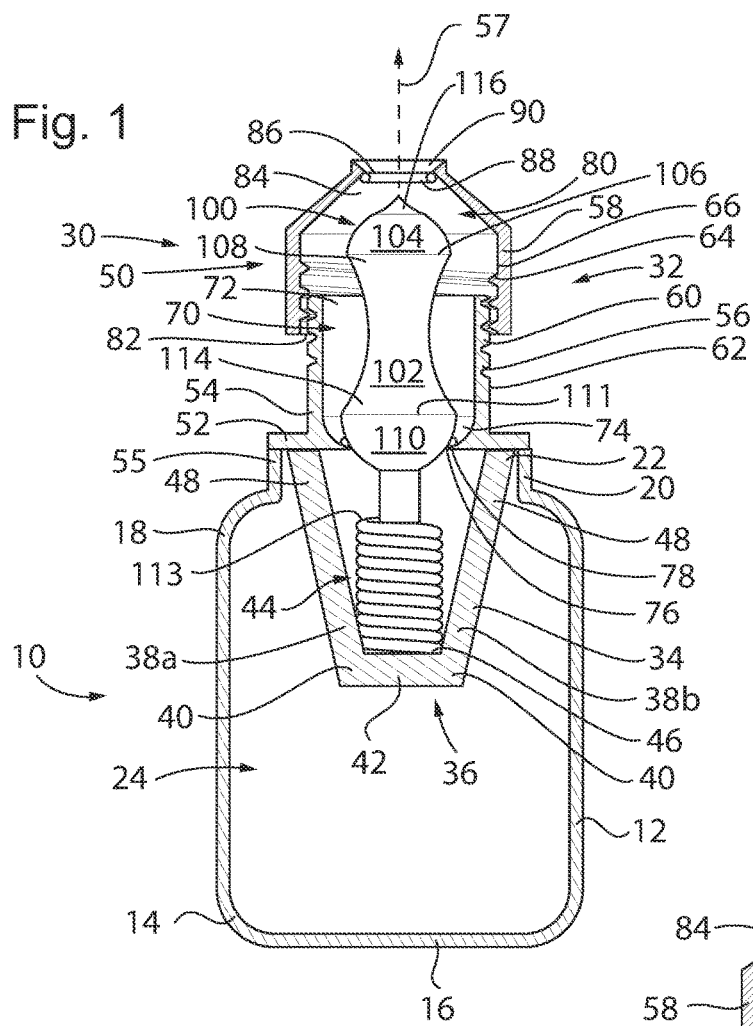
FIG. 1 is a side cross-sectional elevation view of a squeeze bottle having a metering nozzle of the present invention showing the metering nozzle in a first downward position.

Referring to FIG. 1, a squeeze bottle 10 is provided having a generally cylindrical housing comprised of a curved vertical sidewall 12 enclosed at a bottom end 14 by a circular floor 16. A top end 18 of the curved vertical sidewall 12 tapers inward and upward to a bottle neck portion providing a cylindrical neck 20 with a circular opening 22.

The squeeze bottle 10 may be constructed of a durable plastic material allowing the user to squeeze the curved vertical sidewall 12, for example, at opposed sides of the curved vertical sidewall 12 to decrease a volume of an interior cavity 24 of the squeeze bottle 10 and increase a pressure inside the interior cavity 24 of the squeeze bottle 10. The plastic material may be high density polyethylene, polyethylene terephthalate, polyvinyl chloride, polycarbonate, polypropylene, polystyrene, postconsumer resin and the like.

Figure 2:
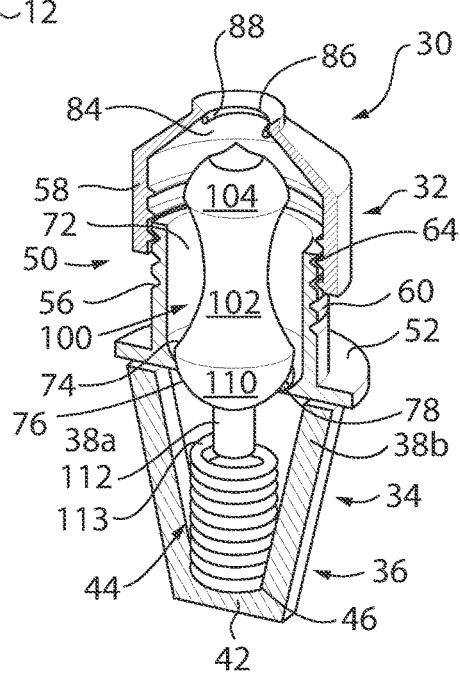
FIG. 2 is a perspective cross-sectional view of the squeeze bottle of FIG. 1.

Referring to FIGS. 1 and 2, a nozzle 30 may be inserted into the circular opening 22 of the cylindrical neck 20. The nozzle 30 may include an upper end 32 extending above the circular opening 22 of the cylindrical neck 20 and a lower end 34 extending below the circular opening 22 of the cylindrical neck 20 and into the interior cavity 24 of the squeeze bottle 10.

The lower end 34 of the nozzle 30 may include a V-shaped spring support 36 with a flattened bottom, the spring support 36 having opposed inwardly and downwardly converging vertical support bars 38a, 38b coupled at their lower ends 40 by a horizontal support bar 42. The horizontal support bar 42 may have a width commensurate with an outer diameter of an extension spring 44 having a first bottom end 46 attached to the horizontal support bar 42, and to be further described below.

Top ends 48 of the vertical support bars 38a, 38b may be coupled to the upper end 32 of the nozzle 30, the upper end 32 including a cylindrical housing 50 having an outwardly extending circular flange 52 at a lower end 54 of the cylindrical housing 50 extending over the circular opening 22 of the squeeze bottle 10. The flange 52 extends over and contacts an upper rim 55 of the cylindrical neck 20 to seal the cylindrical housing 50 and the squeeze bottle 10, for example, by an adhesive or sealant. In this respect, the liquid contents of the squeeze bottle 10 may not seep out at the connection points of the cylindrical housing 50 to the squeeze bottle 10. It is understood that an elastomeric seal, such as a gasket may be used to friction fit the cylindrical housing 50 and/or flange 52 to the squeeze bottle 10. Alternatively, the cylindrical housing 50 and/or flange 52 may include a threaded connection allowing the cylindrical housing 50 to be screw tightened to the squeeze bottle 10.

The cylindrical housing 50 may be defined by a hollow inner shell 56 interconnecting with a hollow outer shell 58 extending at least partially over the inner shell 56 and axially rotated about a vertical axis 57 with respect to the inner shell 56 to increase or decrease a total inner volume of the cylindrical housing 50. For example, the inner shell 56 may include threads 60 on an outer surface 62 of the inner shell 56 and mating with threads 64 on an inner surface 66 of the outer shell 58 whereby axially rotating the outer shell 58 with respect to the inner shell 56 about vertical axis 57 causes the outer shell 58 to raise and lower with respect to the inner shell 56, and thus, increase and decrease the total inner volume of the cylindrical housing 50, respectively.

The hollow inner shell 56 may include an inner cylindrical cavity 70 having an upper circular opening 72 and tapering downward in diameter to a rounded floor forming a bottom seat 74 with a lower hole opening 76. The lower hole opening 76 may be encircled by an elastomeric seal, such as a gasket material 78, for example, an O-ring.

The outer shell 58 may include an inner cylindrical cavity 80 having a lower circular opening 82, corresponding in size with the upper circular opening 72 of the inner shell 56, and tapering upward in diameter to a rounded ceiling forming in top seat 84 with an upper hole opening 86. The upper hole opening 86 may be encircled by an elastomeric seal, such as a gasket material 88, for example, an O-ring. The upper hole opening 86 may also include an upper lip 90 to assist with dispensing the liquid contents.

A piston 100 may be held within the cylindrical housing 50 and biased downward by the extension spring 44. The piston 100 may be dumbbell-shaped and include a center bar 102 taking a generally cylindrical shape with a constricted or narrower waist. The upper and lower outer ends of the piston 100 have rounded portions defined by an upper hemisphere 104 with a circular flat face 106 of the upper hemisphere 104 coupled to a top end 108 of the center bar 102 and a lower hemisphere 110 with a circular flat face 111 of the lower hemisphere 110 coupled to a bottom end 114 of the center bar 102. The shape of the upper hemisphere 104 and lower hemisphere 110 generally correspond with the rounded inner surface of top seat 84 and bottom seat 74, respectively. A length of the piston 100 may be shorter than a distance between the top seat 84 and bottom seat 74 such that only one of the top seat 84 and bottom seat 74 may be contacted by the piston 100 at a time.

The upper hemisphere 104 may further include a pointed tip 116 extending upward through the upper hole opening 86. For example, the pointed tip 116 may be used to break a seal over the upper hole opening 86.

The lower hemisphere 110 may include a coupling rod 112 extending downward from the lower hemisphere 110 and having a lower distal end attached to a second upper end 113 of the extension spring 44. The extension spring 44 may be biased toward a compressed state whereby extending the extension spring 44 so that it increases in length supplies a returning biasing force to the compressed state. The compressed length of the extension spring 44 may generally be less than the length of the vertical support bars 38*a*, 38*b* whereby the extended length of the extension spring 44 may generally be equal to the length of the vertical support bars 38*a*, 38*b*. In this respect, when the extension spring 44 is compressed, the piston 100 is biased toward a first downward position whereby the lower hemisphere 110 is seated against the bottom seat 74 against the gasket material 78. When the extension spring 44 is extended, the piston 100 is in a second upward position whereby the upper hemisphere 104 is seated against the top seat 84.

Referring to FIGS. 1 through 4, in operation, the user may rotate the outer shell 58 with respect to the inner shell 56 to increase or decrease the desired total inner volume of the cylindrical housing 50. The total inner volume of the cylindrical housing 50 may approximately equal the volume of the inner cylindrical cavity 70 of the inner shell 56 plus the volume of the inner cylindrical cavity 80 of the outer shell 58 that is not received by the inner shell 56 subtracting the volume of the piston 100. It is understood that the more the inner shell 56 and outer shell 58 overlap, the smaller the total inner volume of the cylindrical housing 50, and the less the inner shell 56 and outer shell 58 overlap, the larger the total inner volume of the cylindrical housing 50. The center bar 102 of the piston 100 may be concave to maximize the total inner volume of the cylindrical housing 50.

Initially, the lower hemisphere 110 of the piston 100 is firmly seated against the bottom seat 74 of the inner shell 56 against the gasket material 78. The spring 44 prevents movement of the piston 100 under the force of gravity alone.

When it is desired to dispense the liquid contents from the interior cavity 24 of the squeeze bottle 10 in an amount generally equal to the total inner volume of the cylindrical housing 50, the user squeezes the squeeze bottle 10 to decrease the volume of the interior cavity 24 of the squeeze bottle 10 and increase the pressure of the interior cavity 24 of the squeeze bottle 10. This action causes the piston 100 to move upward to a second upward position against the biasing force of the extension spring 44 such that the upper hemisphere 104 of the piston 100 is firmly seated against the top seat 84 of the outer shell 58 against the gasket material 88 as seen in FIGS. 3 and 4. The piston provides a drag surface interacting with the liquid contents entering the cylindrical housing 50 to hold the piston 100 along with the entering liquid against the biasing force of the spring 44.

Referring to FIGS. 3 through 4, when the squeeze bottle 10 is squeezed and the piston 100 is pushed to the second upward position, liquid contents of the squeeze bottle 10 may be squeezed through the lower hole opening 76 into the cylindrical housing 50 to fill the inner cylindrical cavity 70 and inner cylindrical cavity 80. The liquid contents are prevented from dispensing or leaving the cylindrical housing 50 by the blockage of the upper hole opening 86 by the piston 100.

Referring again to FIGS. 1 through 2, when the squeeze bottle 10 is released or decompressed, the piston 100 returns to the first downward position. The squeeze bottle 10 may then be tilted or inverted to pour or release the liquid contents through the upper hole opening 86. The liquid contents are prevented from flowing back into the squeeze bottle 10 by the blockage of the lower hole opening 76 by the piston 100.

It is understood that the liquid contents to be dispensed from the squeeze bottle 10 may be a non-viscous liquid such as soap, shampoo, conditioners, body washes, and the like, which could be dispensed from the squeeze bottle 10 by pouring or tilting the squeeze bottle 10 and without further squeezing the bottle 10.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A dispensing bottle for liquids comprising:
    a bottle having an open top and compressible by a user to expel a fluid from the bottle out of the open top;
    a fluid chamber defining an internal volume and having an upper opening surrounded by a first sealing surface and a lower opening surrounded by a second sealing surface, the lower opening communicating with the open top of the bottle; and
    a piston having a first end opposite a second end held within the internal volume and moveable within the internal volume of the fluid chamber between a retracted position and an extended position, whereby, in the retracted position, the second end is seated and seals against the second sealing surface of the lower opening to prevent flow through the lower opening and allow flow through the upper opening and, in the extended position, the first end is seated against the first sealing surface of the upper opening to prevent flow through the upper opening and allow flow through the lower opening;
    wherein the piston is shaped to provide an open, unsealed passage between the piston and the chamber about a circumference of the piston as the piston moves between the retracted position to the extended position to provide unobstructed free flow through the fluid chamber from the lower opening and out through the upper opening as the piston moves from the retracted position to the extended position;

wherein the piston is biased toward the retracted position by a spring;

wherein the fluid chamber has two halves moveable with respect to each other to change the internal volume; and wherein the halves comprise an outer shell and an inner shell, and wherein the outer shell and the inner shell are joined by screw threads at a lower end and an upper end of the outer shell and the inner shell, respectively, to change the internal volume.

2. The bottle of claim 1 wherein the piston provides a drag surface interacting with a liquid entering the internal volume to hold the piston along with the entering liquid against a biasing force of the spring.

3. The bottle of claim 2 wherein the first end and second end are joined by a connector having a smaller diameter than the opposed first and second ends.

4. The bottle of claim 3 wherein the first end and second end are seated against inner surfaces of the enclosed fluid chamber tapering upwards to the upper opening.

5. The bottle of claim 2 wherein a length of the piston is less than a distance between the upper opening and lower opening of the enclosed fluid chamber.

6. The bottle of claim 1 wherein the spring prevents opening of the lower opening under a force of gravity alone.

7. The bottle of claim 6 wherein the spring is an extension spring.

8. The bottle of claim 7 wherein the spring provides a first end opposite a second end and the first end of the spring is connected to the piston and a second end of the spring is connected to a fixed support bar.

9. The bottle of claim 8 wherein the fixed support bar is spaced from the piston and positioned within the bottle.

10. A method of dispensing a fluid from a bottle comprising:

providing a bottle having an open top and compressible by a user to expel a fluid from the bottle out of the open top; a fluid chamber defining an internal volume and having an upper opening surrounded by a first sealing surface and a lower opening surrounded by a second sealing surface, the lower opening communicating with the open top of the bottle, the fluid chamber adjustable to change the internal volume; and a piston having a first end opposite a second end held within the internal volume and moveable within the internal volume of the fluid chamber between a retracted position and an extended position whereby, in the retracted position, the second end is seated and seals against the second sealing surface of the lower opening to prevent flow through the lower opening and allow flow through the upper opening and, in the extended position, the first end is seated against the first sealing surface of the upper opening to prevent flow through the upper opening and allow flow through the lower opening, wherein the piston is shaped to provide an open, unsealed passage between the piston and the chamber about a circumference of the piston as the piston moves between the retracted position to the extended position to provide unobstructed free flow through the fluid chamber from the lower opening and out through the upper opening as the piston moves from the retracted position to the extended position, wherein the piston is biased toward the retracted position by a spring, wherein the fluid chamber has two halves moveable with respect to each other to change the internal volume, wherein the halves comprise an outer shell and an inner shell, and wherein the outer shell and the inner shell are joined by screw threads at a lower end and an upper end of the outer shell and the inner shell, respectively, to change the internal volume;

compressing the bottle to decrease a volume within the bottle thereby forcing the piston from the retracted position to the extended position and to cause fluid to flow into the enclosed chamber;

releasing compression force on the bottle; and dispensing the fluid from the upper opening of the enclosed chamber.

\* \* \* \* \*